Figure 1:
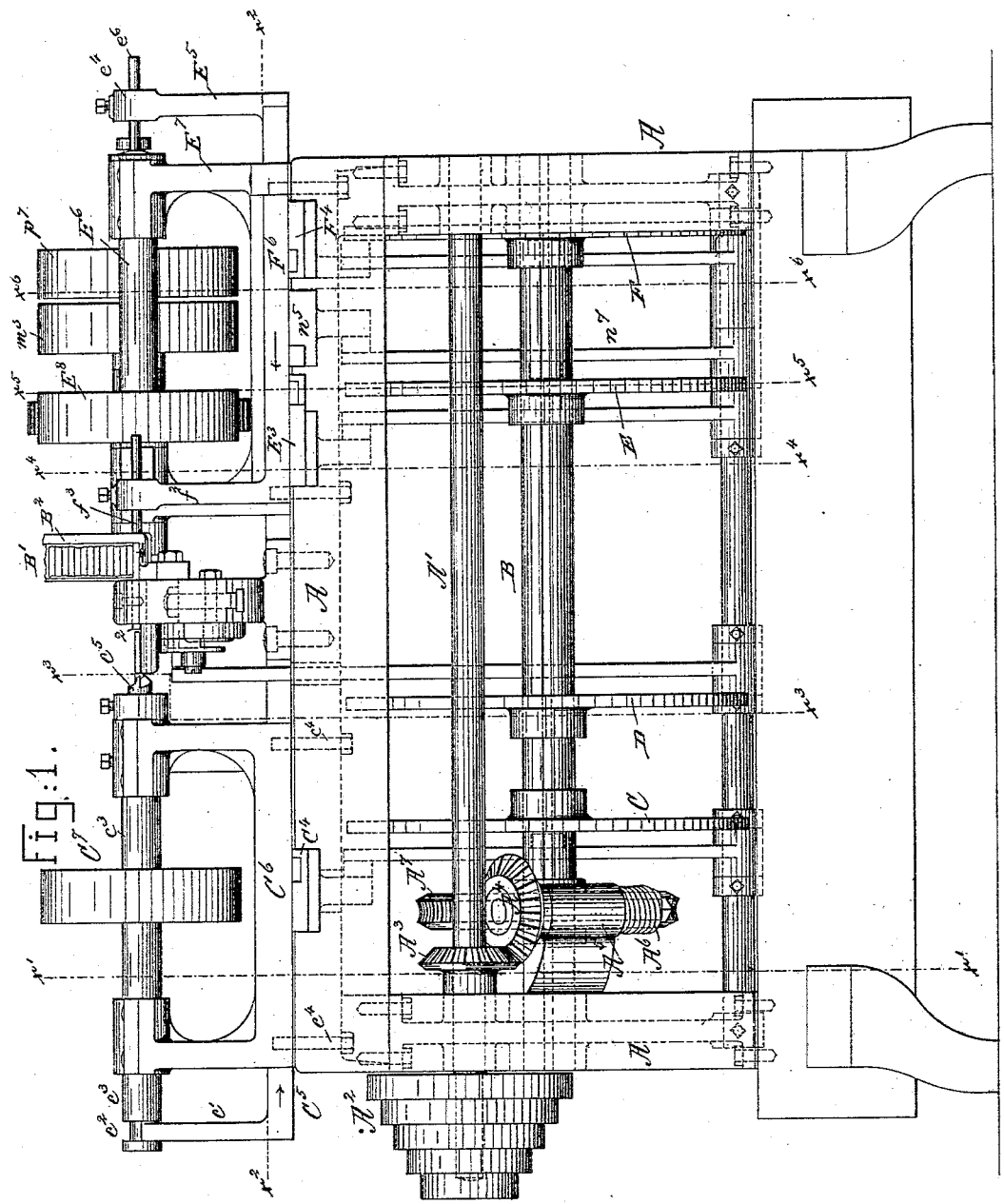

(No Model.)

6 Sheets—Sheet 1.

C. F. ROPER.
SCREW MACHINE.

No. 373,684.

Patented Nov. 22, 1887.

Witnesses.
Arthur Zipperlen.
John F. C. Prinkert

Inventor.
Charles F. Roper.
by Crosby & Gregory attys.

(No Model.) 6 Sheets—Sheet 2.
C. F. ROPER.
SCREW MACHINE.
No. 373,684. Patented Nov. 22, 1887.
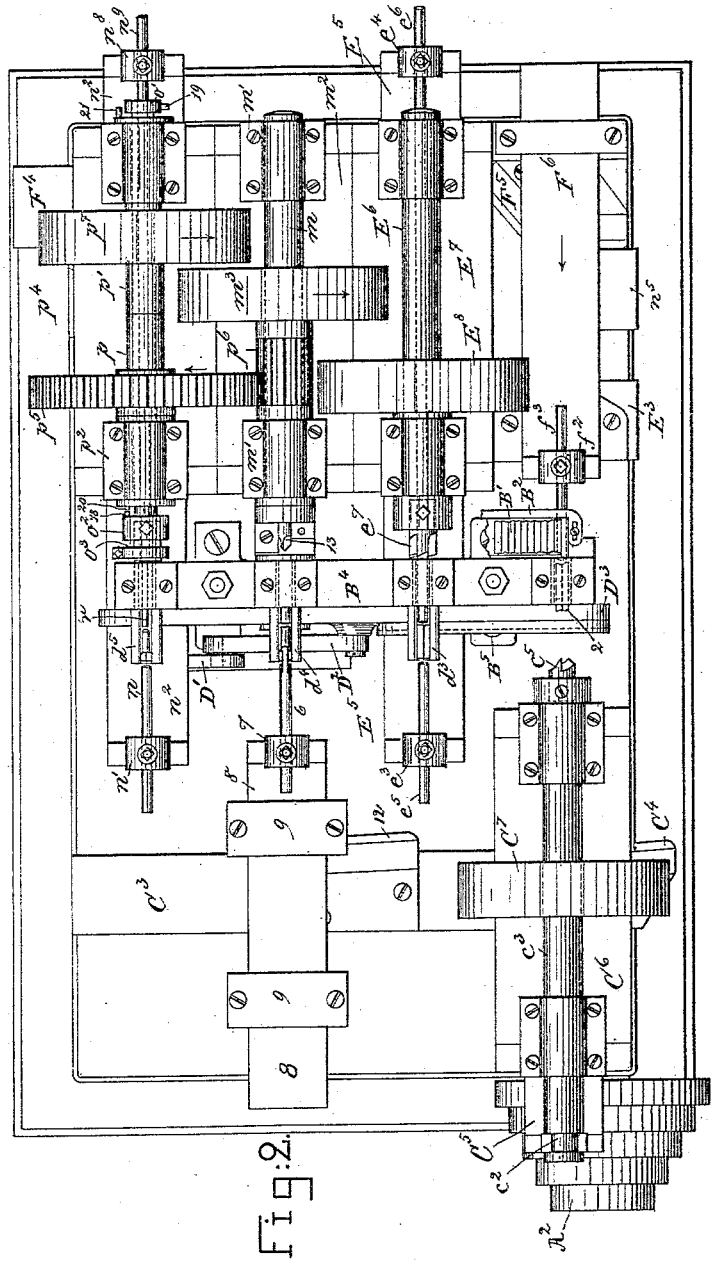
Fig. 2.
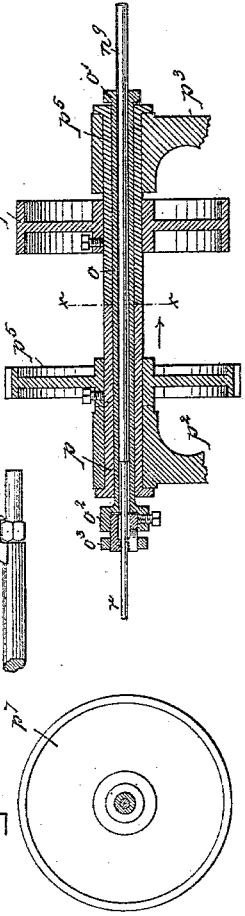
Fig. 4. Fig. 4ᵃ.
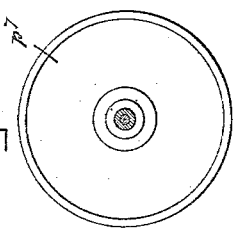
Fig. 5.
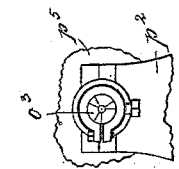
Fig. 3.
Witnesses.
Arthur Zipperlen.
John F. C. Premkert.
Inventor.
Charles F. Roper.
by Crosby & Gregory attys

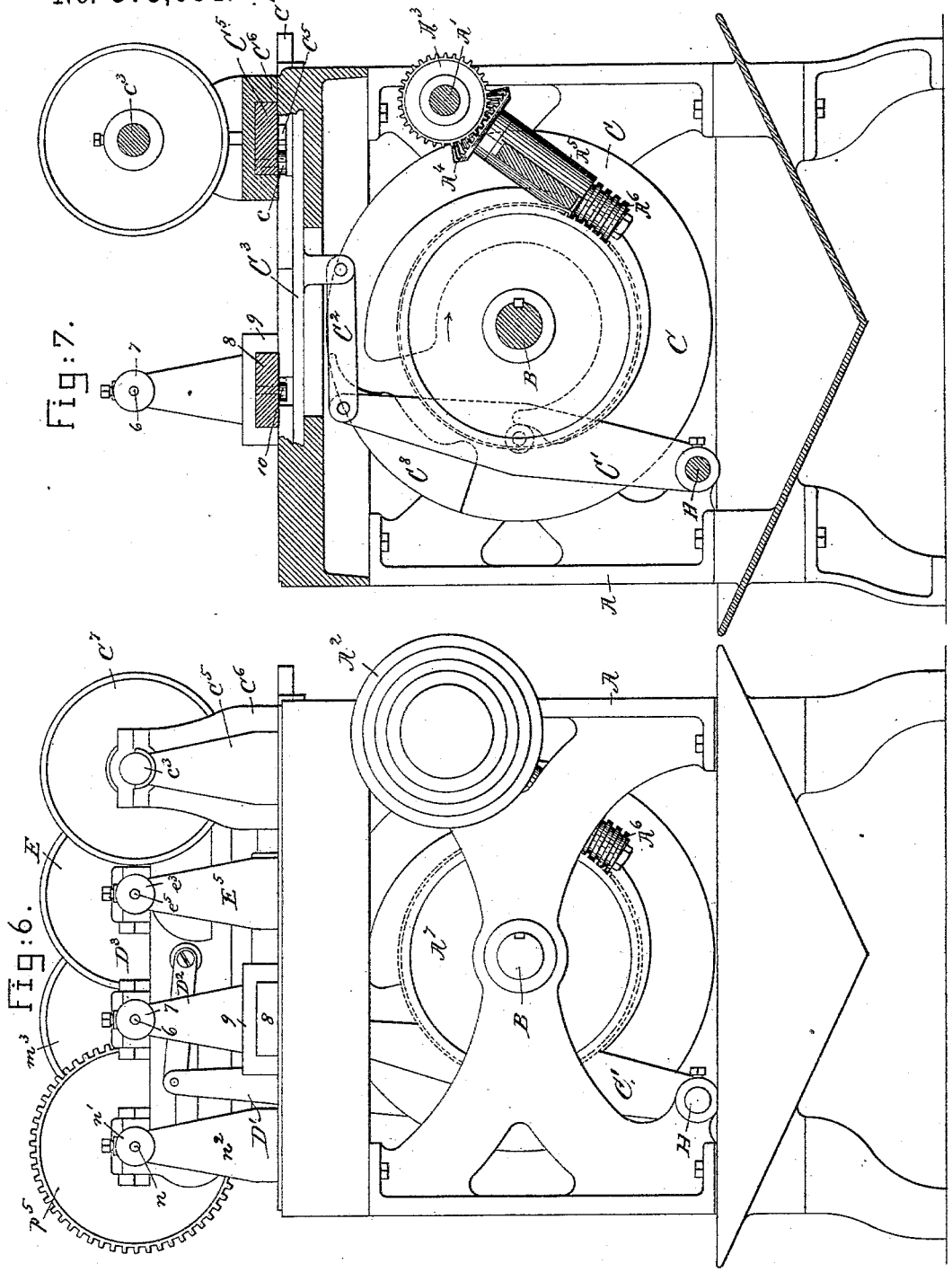

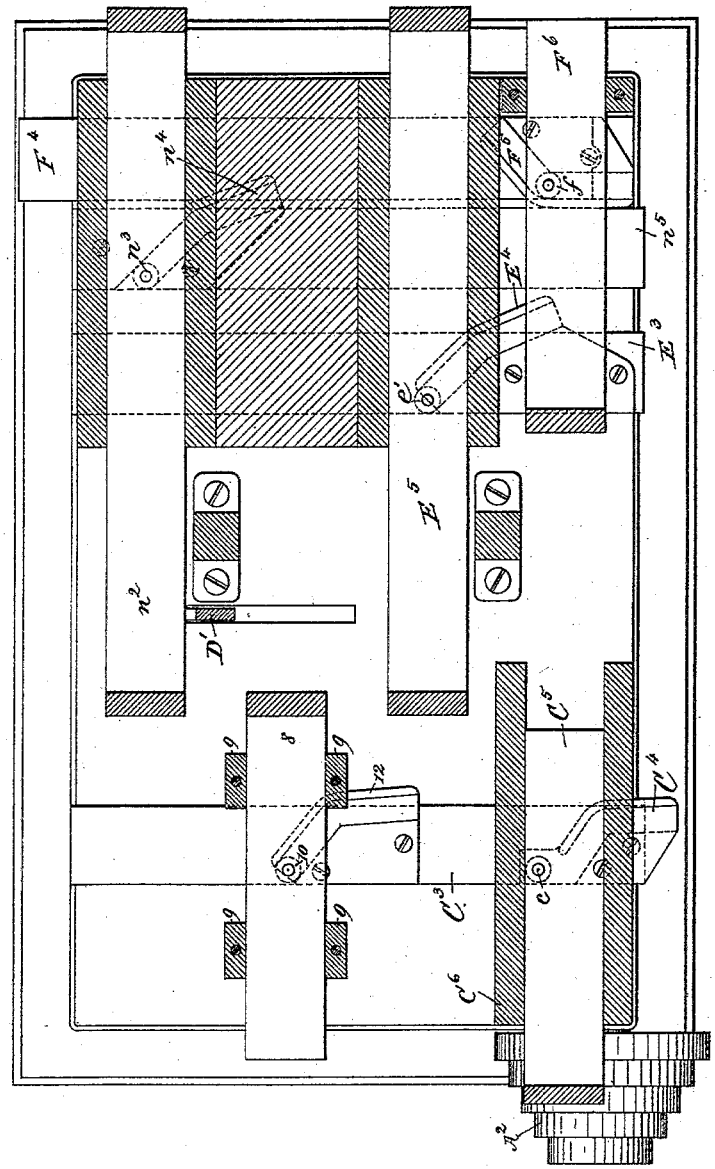

(No Model.) 6 Sheets—Sheet 5.
C. F. ROPER.
SCREW MACHINE.
No. 373,684. Patented Nov. 22, 1887.
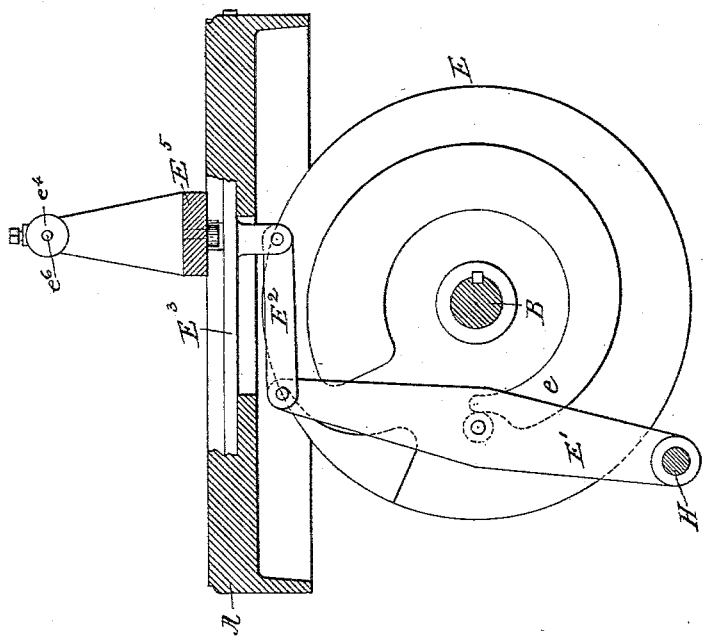
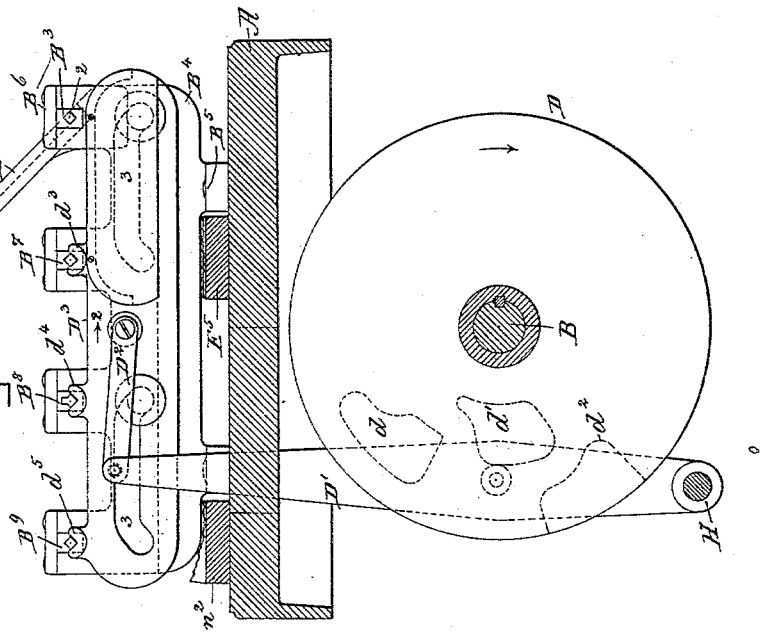
Witnesses.
Arthur Lippitt,
John F. C. Prinkert
Inventor.
Charles F. Roper.
by Crosby & Gregory attys (No Model.) 6 Sheets—Sheet 6.

C. F. ROPER.
SCREW MACHINE.

No. 373,684. Patented Nov. 22, 1887.

Witnesses.
Arthur Liepertin.
John F. C. Preinkert.

Inventor.
Charles F. Roper.
by Crosby & Gregory Attys

UNITED STATES PATENT OFFICE.

CHARLES F. ROPER, OF HOPEDALE, ASSIGNOR TO FREDERICK P. FISH, TRUSTEE, OF CAMBRIDGE, MASSACHUSETTS.

SCREW-MACHINE.

SPECIFICATION forming part of Letters Patent No. 373,684, dated November 22, 1887.

Application filed December 27, 1884. Renewed March 30, 1887. Again renewed October 28, 1887. Serial No. 253,623. (No model.)

*To all whom it may concern:*

Be it known that I, CHARLES F. ROPER, of Hopedale, county of Worcester, State of Massachusetts, have invented an Improvement in Screw-Making Machines, of which the following description, in connection with the accompanying drawings, is a specification, like letters on the drawings representing like parts.

This invention has for its object to effect improvements in machines for making headed screws from blanks, the bodies of the screws being milled to the proper diameter, leaving the heads to correspond in size with the cross-section of the blank, such screws being usually called "cap" or "set" screws.

In accordance with my invention the blanks, cut to proper lengths from square, hexagonal, or other desired shaped rods, are piled or placed in a raceway, from which they are driven singly into a bushing or holder, which holds the body of the said blank while its head end is being acted upon by a head-finishing tool, which gives the desired shape to the top of the head. The top of the head having been shaped, the blank is transferred from the bushing or holder into a groove of a reciprocating carrier, which for such purpose is placed opposite the bushing or holder. The blank having been transferred into said groove, the carrier, by a movement in the reverse direction, places the blank in line with a second bushing or holder, into which it is driven, and partially through and beyond which the body end of the blank is fed to be acted upon by the milling-tool, which reduces the blank to form the body. After this the blank is transferred to a second groove in the same carrier, by which groove the blank is placed opposite a third bushing or holder, into which it is driven, and through and beyond which it is fed sufficiently to be acted upon by a point-shaping tool. Then the blank is again transferred to a third groove in the carrier, and by it is placed in line with a fourth bushing or holder, through which it is fed at the proper speed and for the proper distance, while a threading-tool cuts threads on the body of the blank, the thread-cutting tool is withdrawn from the blank, and the completed screw is forced out of the bushing or holder.

The different operations above referred to are all accomplished automatically.

The particular features in which my invention consists will be hereinafter set forth, and designated in the claims at the end of this specification.

Figure 12:
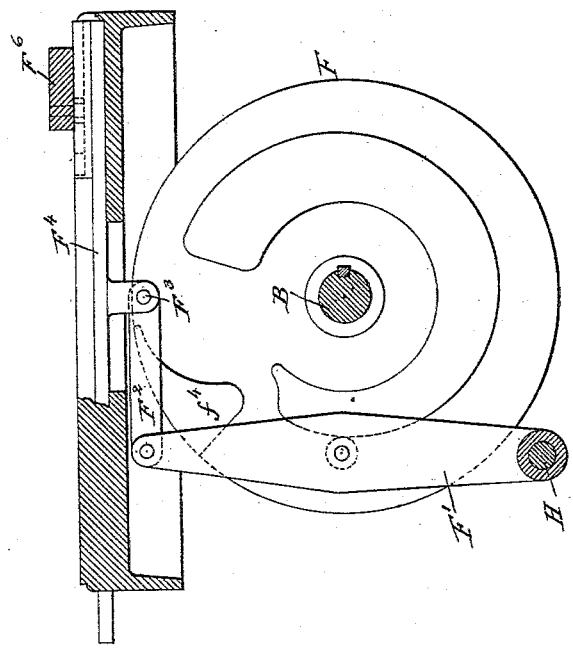
Figure 11:
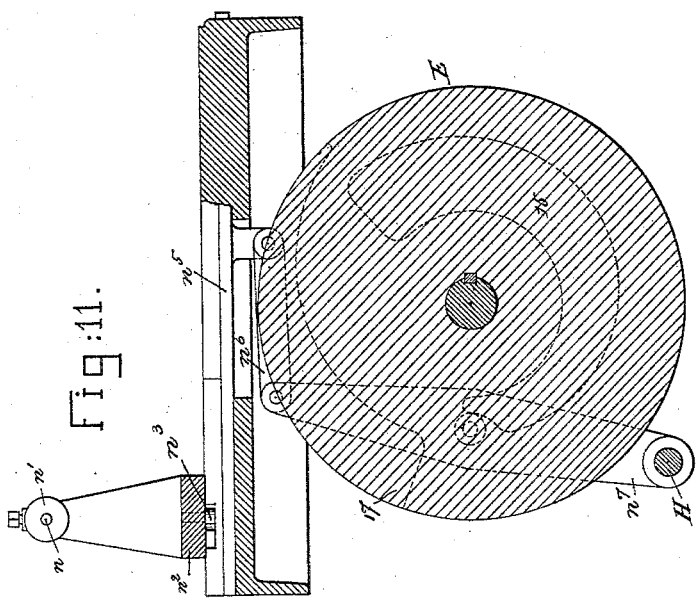

Figure 1 is a front elevation of a machine embodying my improvements; Fig. 2, a top or plan view; Fig. 3, a detail showing the front end of the threading-tool, the stand $p^2$, and part of the gear $p^5$; Fig. 4, a detail in longitudinal section of the threading-tool, its spindle, and some of the devices instrumental in rotating the same, and the rod for ejecting the finished screw; Fig. $4^a$, a detail to be referred to; Fig. 5, a section of the spindle and rod in the dotted line $x\ x$ of Fig. 4, the said section being at the meeting ends of the sleeves; Fig. 6, a left-hand end view of the machine shown in Fig. 1; Fig. 7, a section in the dotted line $x'\ x'$, Fig. 1; Fig. 8, a horizontal section in the dotted line $x^2\ x^2$, Fig. 1; Fig. 9, a sectional detail in the irregular dotted line $x^3\ x^3$, Fig. 1, looking toward the right. Fig. 10 is a section in the line $x^4\ x^4$, to show only the milling-slide and devices to move it. Fig. 11 is a like detail on the dotted line $x^5\ x^5$, to show the threading-slide and the devices to move it, the said section being through one of the cam-plates, and showing by dotted lines cams at the right-hand side thereof; Fig. 12, a like detail on the dotted line $x^6\ x^6$, to show the blank-feeding slide and devices to move it.

The frame-work A of the machine, of proper shape to support the working parts, has mounted in it a driving-shaft, A', which at its left-hand end is provided with a cone-pulley, $A^2$, which receives the belt by which the shaft A' is driven at the proper speed, according to the work to be done. The shaft A' is provided with a bevel-gear, $A^3$, which engages a bevel-gear, $A^4$, and which rotates a worm-shaft, $A^6$, held in bearings $A^5$, the worm engaging a worm-gear, $A^7$, fast on the cam-shaft B. The cam-shaft is provided with four cam-disks, C, D, E, and F. The metal blanks B', square, octagonal, or of other suitable shape in cross-section, are laid or piled in the chute $B^2$, the lower end of which is provided with a suitable lip to arrest the undermost blank directly opposite the opening in a bushing or holder, B³, which is herein shown as composed of two jaws (see Fig. 9) held by a cap, B⁶, in a crotch of a standard, B⁴, attached to the frame by suitable screws, one of which is shown at B⁵. This standard at suitable regular distances apart has three additional bushings or holders, (marked, respectively, B⁷, B⁸, and B⁹,) each being made and held as stated of bushing B³. The openings in these bushings correspond in shape and size with the cross-section of the blank, and each blank as it is being made into a screw is pushed into one after another of these bushings, as hereinafter described, where it is held while it is being subjected in succession to the action of the different tools, to be described. The disk F acts upon a roller-stud of a lever, F', having its fulcrum on a rod, H, and moves the said lever so that its attached link F², pivoted to an ear, F³, of the slide F⁴, causes the said slide to be reciprocated transversely of the machine in guideways of the frame, so that the cam F⁵, secured to the upper side of the said slide, is made to act against the roller-stud f of and reciprocates the feeding-slide F⁶, provided at its inner end with an ear, f², in which, by a suitable set-screw, is held the rod f³, which as the slide F⁶ is moved forward or in the direction of the arrow thereon, Fig. 1, enters a hole in the side of the chute B² opposite the end of the lowermost blank and pushes the said blank out from the chute longitudinally into the bushing or holder B³.

In Fig. 1 the rod f³, which I shall denominate the "blank-feeder," is shown as pushed forward, as stated, and the head of the blank is left protruded, as at 2, to be acted upon by a suitable head-shaping tool, which will now be described. The cam-disk C (shown best in Fig. 7, where the cam is represented partially in dotted lines) acts upon a roller or other stud of a lever, C', on the rod H, and moves the said lever so that it, by the link C², moves the slide C³, provided at top with the cam C⁴. The cam C⁴ acts on the roller or other stud c of the heading-slide C⁵, provided with an upright, c', forked at its upper end to enter an annular groove, c², (see Fig. 1,) in the heading-spindle c³, having its bearings in a head, C⁶, attached by bolts c⁴ to the frame, and acting as a cap to the slide C⁵. The spindle c³, provided with a pulley, C⁷, which will be driven by a belt from a suitable counter-shaft, has at its inner end a head-shaping tool, c⁵, which, as the slide C⁵ is moved in the direction of the arrow thereon, Fig. 1, acts against the head end 2 of the blank and gives to its end the proper shape for the top of the head. The head-shaping tool having done its work, the slide C⁵ is automatically withdrawn by the projection C⁸ of the cam-disk C, and at the same time the portion f⁴ of the cam-disk F acts to move the slide F⁴ in the direction to effect the retraction of the blank-feeder f³. The retraction of the blank-feeder from the chute enables a blank to fall into the space between the end of the retracted feeder and the point end of the blank which has just been acted upon by the head-forming tool. With the parts in this condition the projection d of the cam-disk D acts upon a roller-stud of the lever D', having its fulcrum on the rod H, and moves the said lever, so that the link D² connected with it and with the carrier D³ causes the latter to be moved in the direction of the arrow 2 thereon, Fig. 9, and places the grooved projection d³ thereon just opposite the bushing or holder B³, so that the blank-feeder when next moved, as described, to enter and push a blank from the chute into the said bushing or holder will cause the blank then next the end of the feeder f³ to act upon the blank held in the said bushing B³ and push it out into the groove of the projection d³ of the carrier, where it will rest while the carrier D³ is moved to its full throw in the opposite direction, as shown in Fig. 9, by the projection d' of the cam-disk D, the projection d³ bringing the headed blank in position opposite the second bushing or holder, B⁷, and thereafter, as will be described, the said blank will be pushed into the said bushing or holder. It will be observed that the carrier D³ has three projections, d³ d⁴ d⁵, each of which has a groove to receive a blank, which provision enables one groove after another to receive one blank after another and transfer the same successively opposite the several bushings B³ B⁷ B⁸ B⁹.

The blank referred to as having had its head finished, and which I will call "blank No. 1," having been brought by the carrier opposite the bushing or holder B⁷, the projection e of the cam-disk E commences to act, as in Fig. 10, on the roller-stud of the lever E', having its fulcrum on the rod H, and moves it so that the link E², connected with it and with the slide E³, moves the latter, thereby causing the cam E⁴, on the said slide, to act upon the roller-stud e' of and reciprocate the long milling-slide E⁵, having at its opposite ends standards e³ e⁴. The standard e³ holds the rod e⁵, which pushes blank No. 1 from the groove of the first projection, d³, of the carrier D³ into the bushing B⁷ and gradually pushes the said blank through the said bushing, so that the end of the blank may be properly acted upon by the milling-tool e⁷, the rotation of the blank being prevented by the bushing B⁷. During the reverse movement of the slide E⁵ the rod e⁶, attached to the standard e⁴ and extended through the hollow spindle E⁶ of the milling-tool, pushes the milled blank out of the milling-tool back through the bushing and into the grooves of the projection d⁴ of the carrier D³, that projection being at that time opposite the said bushing, for the carrier is at such time moved forward to receive the blank No. 2, which has just been headed, the head having been finished while blank No. 1 was being milled, as stated. As soon as each blank is pushed from a groove in the carrier into a bushing, the carrier is moved down and forward at an angle, owing to the shape of the slots 3 3 therein, which are entered by rolls on studs connected with the plate $B^4$, the cam projection $d^2$ of the cam-plate D then operating the lever D'. The carrier is lowered before moving it forward, for at the time that it is so started forward the rod $e^5$, as well as the rods 6 and $n$, to be described, have their ends in the bushings or holders, and if the carrier was not lowered the rods would be cut off or the carrier would be broken. The carrier $D^3$ is first lowered and moved partially forward and stopped to give the tools time to operate, and thereafter its forward movement is completed by the cam projection $d$, and the carrier is raised to place its projections $d^3$, &c., in proper position to receive the blanks, and then the carrier in its backward movement is lowered and thereafter raised into its backward position to place the blanks opposite the bushings.

The milling-shaft $E^6$ referred to has its bearings in a head, $E^7$, and is provided with a belt-pulley, $E^8$, by which the said shaft is rotated by belt from a suitable counter-shaft. The milled blank No. 1, left, as stated, in the groove of the projection $d^4$ of the carrier while in its forward position, is next moved by the carrier into position opposite the bushing or holder $B^8$, where its head end is acted upon by the hook-rod 6, (shown separately in Fig. 4ª,) and is pushed from the groove of the carrier into the bushing $B^8$. The shank of the said hook-rod is held in an upright, 7, of a slide-bar, 8, embraced by guides 9 9, the said slide-bar being provided at its under side with a roller-stud, 10. The roller-stud 10 is acted upon by the cam 12 on the slide $C^3$, before described. The hook-rod embracing the head of the blank, as shown in Fig. 4ª, pushes it into the said bushing $B^8$, and through the same far enough to have its point end acted upon by the pointing-tool 13, (see Fig. 2,) attached to the rotating spindle $m$, having its bearings $m'$ in a head, $m^2$, fixed to the frame, the spindle $m$ having on it a pulley, $m^3$, which will be driven by a belt from a counter-shaft. The blank having been pointed, the slide 8 in the operation of the machine is retracted, and at such time the hook of the hook-rod in engagement with the head of the blank draws the latter out of the bushing or holder $B^8$ and leaves it in the groove of the third projection, $d^5$, of the carrier D', it being then again in its forward position. In the next backward movement of the carrier the pointed blank No. 1 is placed in position opposite the fourth bushing or holder, $B^9$, into which it is pushed by the rod $n$, held in a standard, $n'$, of a slide, $n^2$, having at its under side a roller-stud, $n^3$, which is acted upon by the cam $n^4$ of the slide-bar $n^5$, joined by link $n^6$ with the lever $n^7$, having its fulcrum on the rod H, the said lever having a roller-stud (see Fig. 11) which is acted upon to move the slide 8 toward the carrier by the cam projection 15 (see dotted lines) at the right-hand side of the cam-disk E, before described, and shown in Fig. 10, where the cams are at the left-hand side of said disk, viewing the front of the machine, Fig. 1. The cam projection 17 on the disk E will operate the lever $n^7$ to move the slide $n^2$ in the opposite direction, such movement thereof causing the long rod $n^9$, held in the upright $n^8$ of the said slide $n^2$, (see Fig. 2,) to act against the pointed end of the blank after the same shall have been threaded, as will be described, the said rod $n^9$ being extended through the spindle $o$, provided with a head, $o^2$, with which is connected the threading-tool $o^3$, the opposite end of the said spindle having a collar or flange, $o'$. The rear side of the head $o^2$ is provided with a clutch-pin, 18, and the periphery of the collar $o'$ with a clutch-pin, 19, (see Fig. 2,) the said pins co-operating, respectively, with clutch-pins 20 and 21, attached, respectively, to the heads of the sleeves $p$ and $p'$, which receive the spindle $o$ loosely and form bearings for it, the said sleeves in turn taking their bearings in the uprights $p^2$ $p^3$ of a head, $p^4$, fixed to the frame, its foot forming a cap for the slide $n^2$.

The sleeve $p$ is provided with a gear, $p^5$, which is engaged and driven by a pinion, $p^6$, fast on the shaft $m$, before described. The sleeve $p'$ is provided with a belt-pulley, $p^7$, which is driven by a belt from a suitable counter-shaft; but the sleeve $p'$ is rotated in the direction opposite that of the sleeve $p$, the sleeve $p'$ when in clutch with the spindle by the engagement of its clutch-pin 21 with the pin 19 turning the spindle in the direction to turn the threading-tool off from the threaded blank and at a faster speed than the said tool was turned on the said blank to cut the thread, the clutch-pin 20 of the sleeve $p$ being at such time in contact with the clutch-pin 18 of the spindle-head. The rod $n$, acting upon the head end of the blank, is gradually carried forward by the cam $n^4$ to push the blank from the carrier into the bushing $B^9$ and push the blank against the threading-tool, after which, in the further movement of the rod $n$, the blank pushes the spindle of the threading-tool in the sleeves $p\ p'$ in the direction of the arrow, Fig. 4, until the clutch-pin 18 on the head $o^2$ of the spindle $o$ engages the clutch-pin 20 of the rotating sleeve $p$, when at once the rotation of the spindle $o$ and threading-tool will be commenced in the direction to cut the thread on the blank. As soon as the clutch-pins referred to are engaged, the threading-tool commences to cut a thread upon the blank, and the blank is gradually pushed into the said tool fast enough to correspond with the lead of the thread of the tool, and when the thread has been cut nearly to the proper length the movement of the blank by the rod $n$ is stopped, and thereafter in the further rotation of the spindle and tool by the sleeve $p$ the tool is caused to travel longitudinally on the blank, completing the thread and effecting the disengagement of the clutch-pins 18 and 20, when the rotation of the spindle and tool is stopped. The rotation of the spindle having been stopped, the slide $n^2$, in its movement toward the left, Fig. 2, causes the rod $n^9$, by its reduced end $r$, to strike against the point end of the threaded blank yet held in the threading-die, and, acting upon the said blank, moves the spindle $o$ sufficiently far to effect the engagement of the clutch-pin 19 of the spindle with the clutch-pin 21 of the reversely-turning sleeve $p'$, which starts the spindle in rotation in the reverse direction to rotate the threading-tool rapidly off from the blank, while the reduced end $r$ of the rod $n^9$ acts against and pushes the blank out from the threading-tool at a speed corresponding with the speed with which the tool is moved from the blank.

I claim—

1. The blank-receiving chute, the bushing or holder, and the blank-feeder to place a blank in the bushing or holder, combined with the head-shaping tool and with the carrier to take the blank from opposite the first into position opposite the second bushing or holder, substantially as described.

2. The series of bushings or holders, combined with the reciprocating carrier having a series of blank-receiving grooves, the carrier in its movements taking blanks from opposite some of the bushings or holders and placing them in position opposite other of the series of bushings or holders, substantially as described.

3. The series of bushings or holders, the reciprocating carrier, and a blank-feeder, and rods to move the blanks to the bushings or holders from the grooves of the carrier and to return them thereto from the bushing, combined with a head-shaping tool, a reducing-tool, a pointing-tool, and a threading-tool, the said tools operating in succession on and to complete a screw, substantially as described.

4. The bushing or holder to receive the head-finished blank, the reducing-tool, and means to rotate it, combined with the rod $e^5$, means to operate it to gradually feed the blank to the action of the reducing-tool, and with a rod, $e^6$, to discharge the reduced blank therefrom, substantially as described.

5. The bushing or holder and the point-forming tool, combined with the hooked rod 6, to engage the head end of the reduced blank, and with means to operate it to push the said blank into and partially through the said bushing to be acted upon by the pointing-tool, and then to withdraw the said blank from the said bushing, substantially as described.

6. The bushing $B^9$, the screw-threading tool, the spindle to carry it, clutch pins or projections on the said spindle, and the two reversely-rotating sleeves provided with clutch pins or projections, combined with the two rods $n$ and $n^9$, and with a slide-bar to hold and move the said rods, to operate substantially as described.

In testimony whereof I have signed my name to this specification in the presence of two subscribing witnesses.

CHARLES F. ROPER.

Witnesses:
F. J. DUTCHER,
A. B. C. DEMING.